Nov. 19, 1957 W. D. TRACY ET AL 2,813,731
BALL AND SOCKET JOINT WITH INTERNAL BEARING MEANS
Filed Oct. 14, 1955 2 Sheets-Sheet 1

WARD D. TRACY,
ABRAHAM LINCOLN MAGER,
CHARLES A. DASNEY,
INVENTORS.

BY *Lyon & Lyon*
ATTORNEYS.

United States Patent Office 2,813,731
Patented Nov. 19, 1957

2,813,731

BALL AND SOCKET JOINT WITH INTERNAL BEARING MEANS

Ward Douglas Tracy, Glendora, Abraham Lincoln Mager, El Monte, and Charles A. Dasney, Arcadia, Calif., assignors to Southwest Products Co., Pasadena, Calif., a corporation of California Application October 14, 1955, Serial No. 540,491

6 Claims. (Cl. 285—262)

The present invention relates to improved means and techniques in the construction of ducts or conduits and is particularly useful in those arrangements wherein it is desired to convey gases or fluids of high temperature under high pressure and wherein elements of the arrangement are subjected to relative movement with respect to each other, both in the original installation or during subsequent use.

An object of the present invention is to provide an articulated conduit or duct of the character mentioned above for achieving the above-indicated results.

A specific object of the present invention is to provide a duct assembly in which there are two relatively movable parts in which one part may either be rotated with respect to the other part or moved angularly with respect to the same.

Another specific object of the present invention is to provide a duct assembly which includes a pair of articulated members which provides a gas or fluid-tight seal even though the members are subjected to vibration or relative movement with respect to each other, either rotative movement about the axis of the member or angular movement with respect to the axis of the duct, or both of these types of movement simultaneously.

Briefly, the arrangement as described herein includes generally a pair of tubular conduits fitted together by a ball and socket type of connection which allows one of the tubular elements to be not only rotated about its axis but also allows the axis of the tubular element to be rotated so that its axis may be either aligned with the axis of the other element or displaced therefrom in the amount of, for example, ten degrees. Means are provided in the assembly for taking care of either tensile forces which tend to hold the ball and socket connection apart or compressive forces which tend to jam or bind elements of the ball and socket connection. These means for taking care of such compressive and tensile forces are disposed in a unique manner inside the conduit itself so as to achieve certain advantages.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 4:
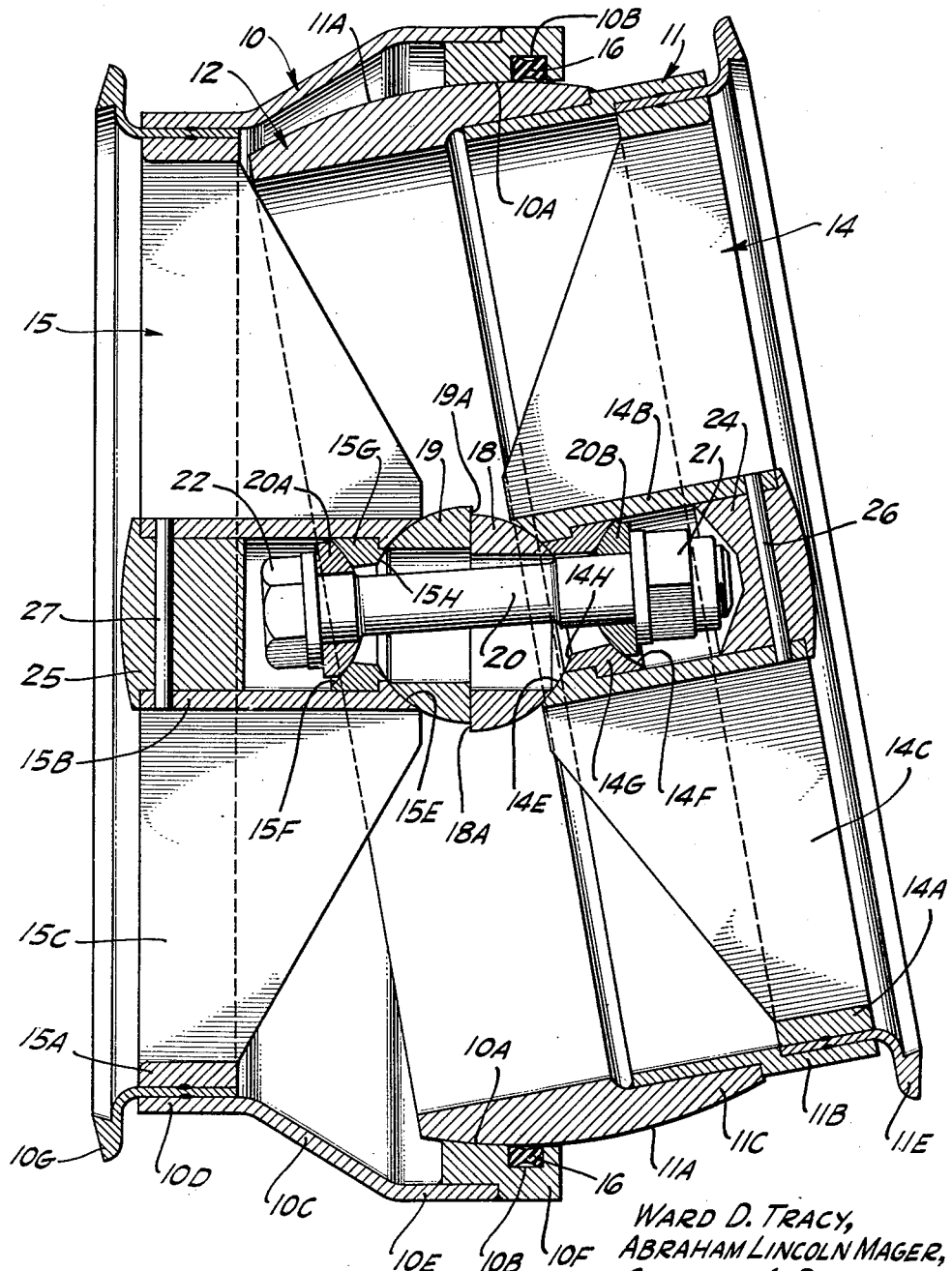
Figure 4 is also a transverse sectional view, but with the elements thereof in a different operating position.

The assembly shown herein provides a gas or fluid duct joint or connection and involves generally a pair of tubular conduits 10 and 11 fitted together by a ball and socket type of connection 12 which allows the tubular element 11 to be not only rotated about its own axis but also allows the axis of the tubular element 11 to be moved so that its axis may be inclined in the amount of, for example, ten degrees with respect to the axis of the other tubular element 10, as shown in Figure 4.

Figure 2:
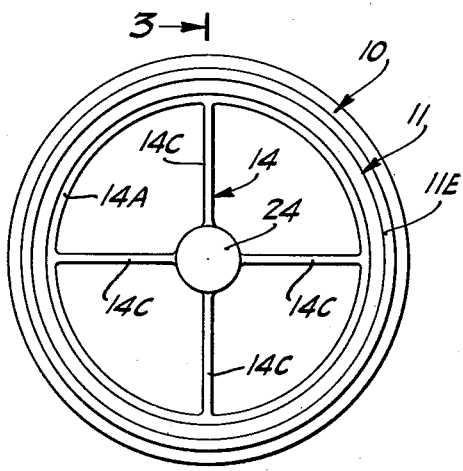
Figure 2 is an end view of the assembly as shown in Figure 1.

Figure 2 shows a four-legged spider 14 near the mouth of the tubular element 11, and a similar four-legged spider construction 15 is near the mouth of the other tube or element 10 for imparting strength and dimensional stability to the assembly and for other purposes described later, since such assembly is used to conduct gases of very high temperatures at very high pressures.

The sliding fit in the ball and socket connection 12 is provided by the abutting concave annular surface 10A of the conduit 10 and the cooperating convex annular surface 11A of the conduit 11. The surface 10A is recessed at 10B to accommodate a suitable gasket, for example a ring-shaped element 16 of silicon rubber, which is referred to in the art as a "quad ring." This ring 16 abuts the surface 11A and supplements the sealing action provided by the interfitted surfaces 10A and 11A.

As shown in the drawings, the conduit 10 is an assemblage of parts which are joined together, as for example by welding, brazing and the like, to form a composite integral structure. These parts include a tubular element 10C formed to provide an outer flanged portion 10D of relatively small diameter and an inner flanged portion 10E of relatively large diameter. The annular bearing block 10F which has the annular bearing surface 10A is suitably joined to the inner flanged portion 10E. The outer flanged portion 10D has suitably joined thereto a conventional coupling element 10G and the aforementioned spider 15.

The other tubular conduit 11 comprises an assembly of parts. These parts include generally a tubular element 11B having an external shoulder portion and an internal shoulder portion. The annular convex bearing member 11C which has the aforementioned bearing surface 11A is suitably mounted and joined to the outer portion of the tubular element 11B in abutting relation to the external shoulder of sleeve 11B; and a suitable conventional ring-shaped fitting 11E and the aforementioned spider 14 are suitably joined to the internal surface of the tubular element 11B in abutting relation to the internal shoulder thereof.

Each of the spiders 14 and 15 is of identical construction and comprise an outer annular ring 14A, 15A joined to an internal hollow hub portion 14B, 15B, by four radially extending arms or legs 14C, 15C.

As seen in Figure 4, each of the hub members 14B and 15B has a pair of concave bearing surfaces 14E, 14F and 15E, 15F. The bearing surfaces 14E and 14F, as shown, are annular and formed on the adjacent ends of the hub members and cooperate with the outer convex surface of the generally hemispherical hollow members 18 and 19, respectively, which have cooperating flat abutting surfaces 18A, 19A and which thus may be referred to generally as "platforms." These two mating and sliding surfaces 18A, 19A are maintained in engagement at all times in all relative positions of the conduits 10 and 11 regardless of whether a tensile or a compressive force exists between the conduits 10 and 11. These two mutually sliding hemispherical elements 18 and 19, cooperating generally in a ball and socket type of connection with the corresponding hub members 14 and 15, provide generally a means for taking care of compressive forces, while tensile forces are taken care of generally by the bolt 20 having bearing members 20A, 20B mounted near opposite ends of the bolt 20. The bearing member 20A has a convex bearing surface which cooperates in a sliding fit with the concave bearing surface 15F of the bearing insert 15G. The insert 15G has a shoulder portion, as shown in Figure 4, which cooperates with the internal shoulder portion of the hub member 15B, and, as shown, is provided with a concave bearing surface 15H which is formed so as to be a continuation of the bearing surface 15E.

In a similar manner, a bearing insert 14G has a shoulder portion abutting an internal shoulder portion of the hub 14B and has the concave bearing surface 14F cooperating with the convex bearing surface on the member 20B. This bearing insert 14G is likewise provided with a concave bearing surface 14H which is formed to be a continuation of the bearing surface 14 so that it may likewise cooperate with the convex bearing surface of the hemispherical platform 18.

As shown, the bolt 20 is threaded on both ends to receive nuts 21 and 22 which bear, respectively, against the elements 20B and 20A. These nuts are adjusted, i. e. tightened, so as to positively maintain the bearing surfaces of members 20A and 20B in engagement with cooperating bearing surfaces on the inserts 14G and 15G.

In order to maintain dimensional stability and thereby to allow proper movement between the various bearing surfaces under the high temperatures and pressures involved, reenforcing plugs 24 and 25 are snugly fitted into the outer ends of the hub members 14B and 15B, respectively, such plugs being locked in position by removable pins 26 and 27, respectively. In order to effect adjustment of the nuts 21 and 22, the plugs 24 and 25 are removed and a suitable wrench is inserted in the hubs to turn the nuts 21, 22.

In order to assure the intended functions, particularly at high temperatures and pressures, the various cooperating ball and socket type of connections involving interfitted concave and convex annular bearing surfaces are required to be formed with a relatively high degree of precision, otherwise undesired binding instead of free movement results.

Figure 3:
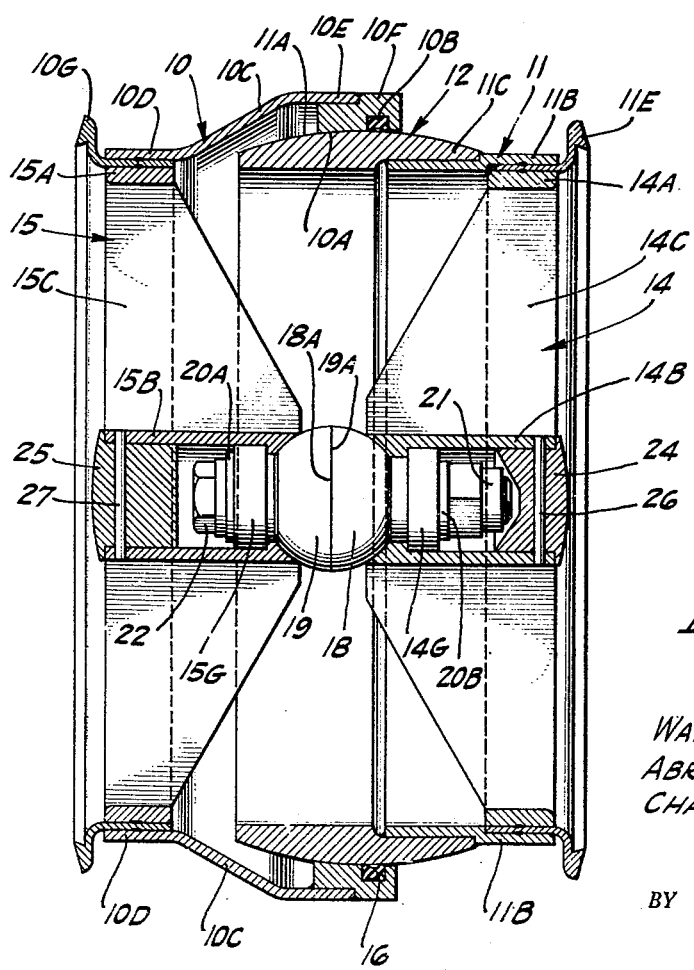
Figure 3 is a transverse sectional view taken as indicated by the line 3—3 in Figure 2, but shows certain elements in elevation.

It should be carefully observed that when the axis of one of the tubular elements is moved out of alignment from its position shown in Figure 3 to the position shown in Figure 4, the axis of the bolt 20 is not necessary in alignment with the axis of either one of the tubular elements 10 or 11, and, further, sliding movement takes place between the flat bearing surfaces 18A and 19A, so that these two hemispherical platforms 18, 19 are also out of alignment.

Figure 1:
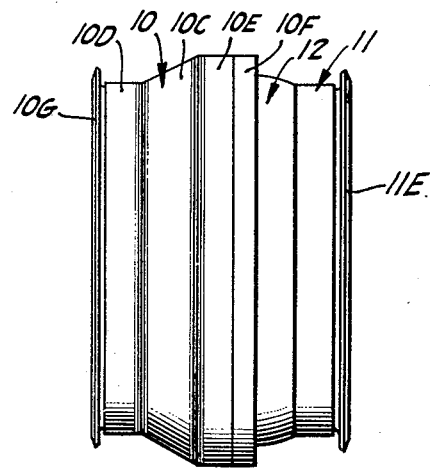
Figure 1 is a view in side elevation of a duct assembly embodying features of the present invention.

Also, to insure proper sealing, the plane of the gasket ring 10B (in the aligned position of the elements 10 and 11, as shown in Figure 1) is displaced in the direction of the internal conduit 11 so as to achieve enhanced sealing.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A duct assembly comprising: a first outer tubular element having an annular concave bearing surface, a second inner tubular element having an annular convex bearing surface abutting said concave bearing surface, a gasket ring recessed in said concave surface and abutting said convex surface, a first spider mounted in said first tubular element and having an annular hub portion, a second spider mounted in said second tubular element and having an annular hub portion, said first and second hub portions each having respectively a first and a second convex bearing surface, a first generally hemispherical hollow member abutting said first hub bearing surface and having a first generally flat bearing surface, a second generally hemispherical hollow member abutting said second hub convex bearing surface and having a second generally flat bearing surface, the first and second flat surfaces abutting each other, a bolt passing through said first and second hub portions and the hollow portions of said first and second hemispherical members, said first and second hub portions having respectively a third concave bearing surface and a fourth concave bearing surface, a first and a second convex bearing member mounted on opposite ends of said bolt and engaging respectively said third and fourth concave bearing surfaces, opposite ends of said bolt being threaded and carrying a first and a second retaining member thereon to maintain said third and fourth bearing surfaces in engagement with their corresponding cooperating bearing surfaces, said first and second retaining members being disposed respectively in said first and said second hub members, and a reenforcing plug in opposite ends of said hub members.

2. An arrangement as set forth in claim 1 in which the plane of said gasket ring is non-planar with respect to said flat bearing surfaces.

3. A duct assembly comprising: a first outer tubular element having a first annular bearing surface, a second inner tubular element having a second annular bearing surface abutting said first bearing surface, a first spider mounted in said outer tubular element and having a hub portion, a second spider mounted in said second tubular element and having a hub portion, said first and second hub portions each having respectively a first and a second bearing surface, a first hollow member abutting said first hub bearing surface and having a first generally flat bearing surface, a second hollow member abutting said second hub bearing surface and having a second generally flat bearing surface, the first and second flat surfaces abutting each other, a bolt passing through said first and second hub portions and the hollow portions of said first and second hollow members, said first and second hub portions having respectively a third bearing surface and a fourth bearing surface, a first and a second bearing member mounted on opposite ends of said bolt and engaging respectively said third and fourth bearing surfaces, said bolt carrying a first and a second retaining member thereon to maintain said third and fourth bearing surfaces in engagement with their corresponding cooperating bearing surfaces.

4. An assembly as set forth in claim 3 in which a gasket ring is disposed between said first and second tubular elements with the plane of said gasket ring being non-planar with respect to said flat surfaces.

5. A duct assembly comprising: a first outer tubular element having an annular concave bearing surface, a second inner tubular element having an annular convex bearing surface abutting said concave bearing surface, a first spider mounted in said tubular element and having a hub portion, a second spider mounted in said second tubular element and having a hub portion, said first and second hub portions each having respectively a first and a second convex bearing surface, a first generally hemispherical hollow member abutting said first hub bearing surface and having a first generally flat bearing surface, a second generally hemispherical hollow member abutting said second hub convex bearing surface and having a second generally flat bearing surface, the first and second flat surfaces abutting each other, a bolt passing through said first and second hub portions and the hollow portions of said first and second hemispherical members, said first and second hub portions having respectively a third concave bearing surface and a fourth concave bearing surface, a first and a second convex bearing member mounted on opposite ends of said bolt and engaging respectively said third and fourth concave bearing surfaces, said bolt carrying a first and a second retaining member thereon to maintain said third and fourth bearing surfaces in engagement with their cooperating bearing surfaces.

6. A duct assembly comprising: an outer tubular element, an inner tubular element, cooperating means on said outer and inner elements defining a ball and socket type of connection, a first supporting structure mounted internally of said outer element, a second supporting structure mounted internally of said inner element, a first bearing member having a flat bearing surface, a second bearing member having a flat bearing surface in engagement with the aforementioned flat bearing surface, cooperating means on said first supporting structure and said first bearing member defining a ball and socket type of bearing, and cooperating means on said second supporting structure and said second bearing member defining a ball and socket type of bearing, said first and second bearing members being hollow, and an elongated tensile member passing therethrough, cooperating means between one end of said tensile member and said first supporting structure defining a ball and socket type of bearing, and cooperating means between the other end of said tensile member and said second supporting structure defining a ball and socket type of bearing.

References Cited in the file of this patent

UNITED STATES PATENTS

| | | |
|---|---|---|
| 275,098 | Walker | Apr. 3, 1883 |
| 866,061 | Phillips | Sept. 17, 1907 |
| 955,927 | Vincent | Apr. 26, 1910 |
| 979,513 | Koenig | Dec. 27, 1910 |
| 1,007,362 | Koenig | Oct. 31, 1911 |

FOREIGN PATENTS

| | | |
|---|---|---|
| 608,847 | France | Apr. 30, 1926 |
| 724,159 | Great Britain | Feb. 16, 1955 |